United States Patent
Yu et al.

(10) Patent No.: US 11,347,359 B2
(45) Date of Patent: May 31, 2022

(54) TOUCH PANEL, MANUFACTURING METHOD OF TOUCH PANEL, AND DEVICE THEREOF

(71) Applicant: TPK Advanced Solutions Inc., Fujian (CN)

(72) Inventors: Chien-Hsien Yu, Zhubei (TW); Zi Jun Ding, Fujian Province (CN); Yun Guo Xu, Fuzhou (CN); Jian Hua Fang, Putian (CN); Mingpei Chen, Fujian Province (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/038,108

(22) Filed: Sep. 30, 2020

(65) Prior Publication Data

US 2022/0100316 A1    Mar. 31, 2022

(51) Int. Cl.
  *G06F 3/044*   (2006.01)
  *G06F 3/041*   (2006.01)

(52) U.S. Cl.
  CPC .......... *G06F 3/0445* (2019.05); *G06F 3/0412* (2013.01); *G06F 2203/04103* (2013.01); *G06F 2203/04112* (2013.01)

(58) Field of Classification Search
  CPC combination set(s) only.
  See application file for complete search history.

(56) References Cited

U.S. PATENT DOCUMENTS

| 2013/0000952 A1 | 1/2013 | Srinivas et al. |
| 2019/0012031 A1* | 1/2019 | Kim ............. H01L 51/5203 |

FOREIGN PATENT DOCUMENTS

| JP | 2018107138 A | 7/2018 |
| JP | 2019219949 A | 12/2019 |
| KR | 20160119934 A | 10/2016 |
| KR | 20160141525 A | 12/2016 |
| KR | 20180098372 A | 9/2018 |
| KR | 20180133942 A | 12/2018 |
| WO | 2016031398 A1 | 3/2016 |
| WO | 2018034119 A1 | 2/2018 |

* cited by examiner

*Primary Examiner* — Deeprose Subedi
(74) *Attorney, Agent, or Firm* — Cooper Legal Group, LLC

(57) ABSTRACT

A touch panel includes a substrate, a peripheral trace, and a touch sensing electrode. The substrate has a visible area, a peripheral area, a bending area, and a non-bending area. The peripheral trace is disposed on the peripheral area. The touch sensing electrode is disposed on the visible area and has a first portion disposed on the bending area and a second portion disposed on the non-bending area. The touch sensing electrode has a mesh pattern interlaced by a plurality of thin lines. The peripheral trace and the touch sensing electrode each includes a plurality of conductive nanostructures and a film layer added onto the conductive nanostructures, and an interface between each of the conductive nanostructures and the film layer that are in the peripheral trace and in the second portion of the touch sensing electrode substantially has a covering structure.

20 Claims, 11 Drawing Sheets

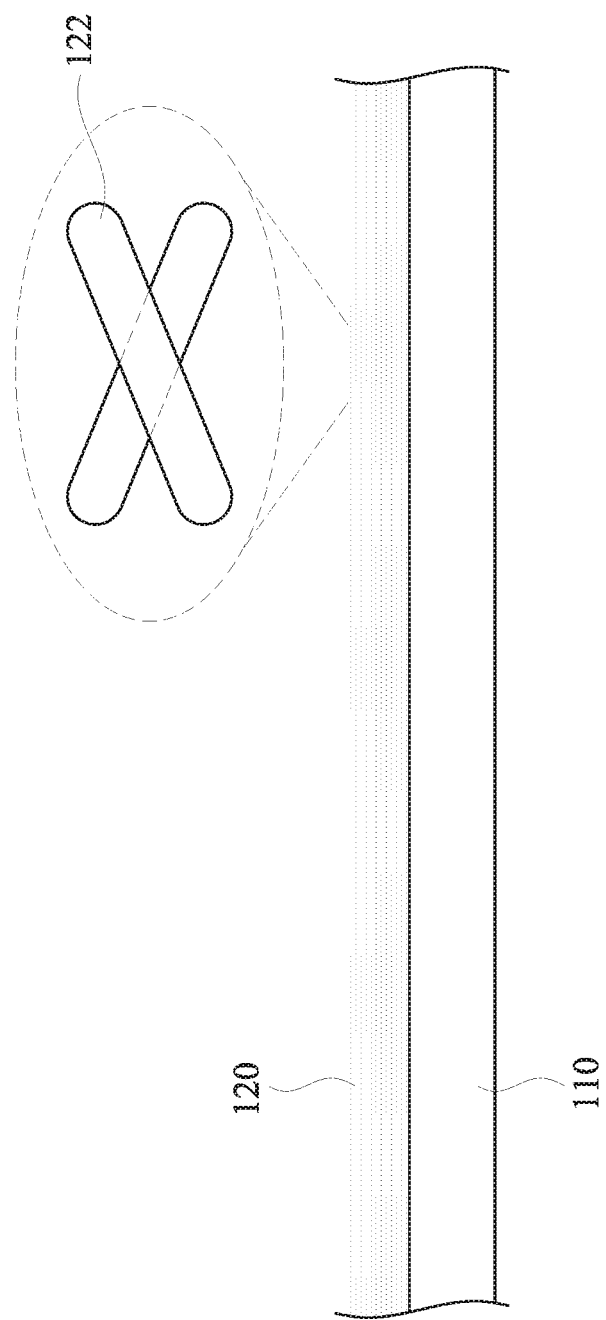

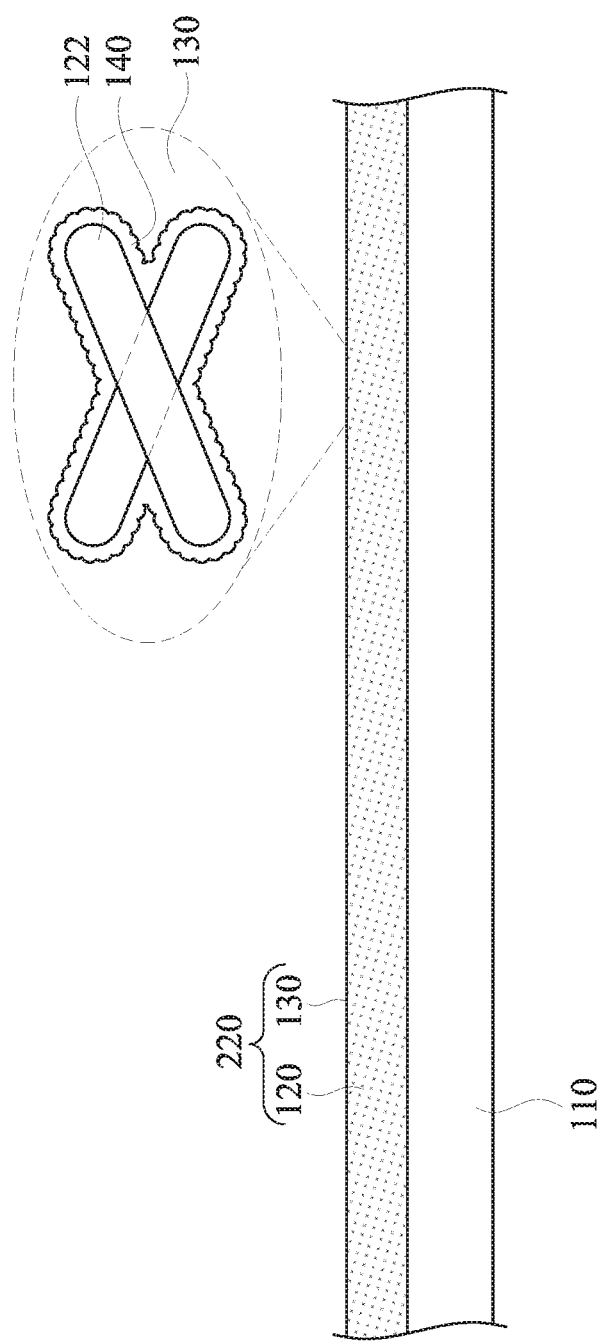

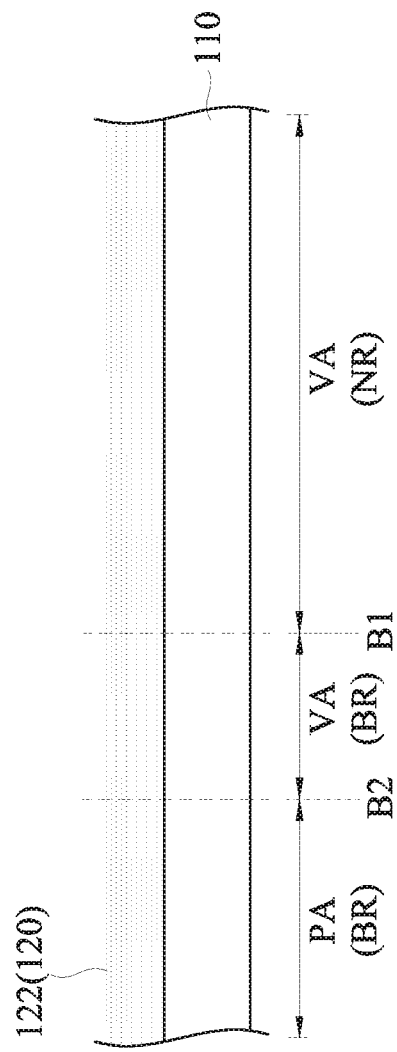
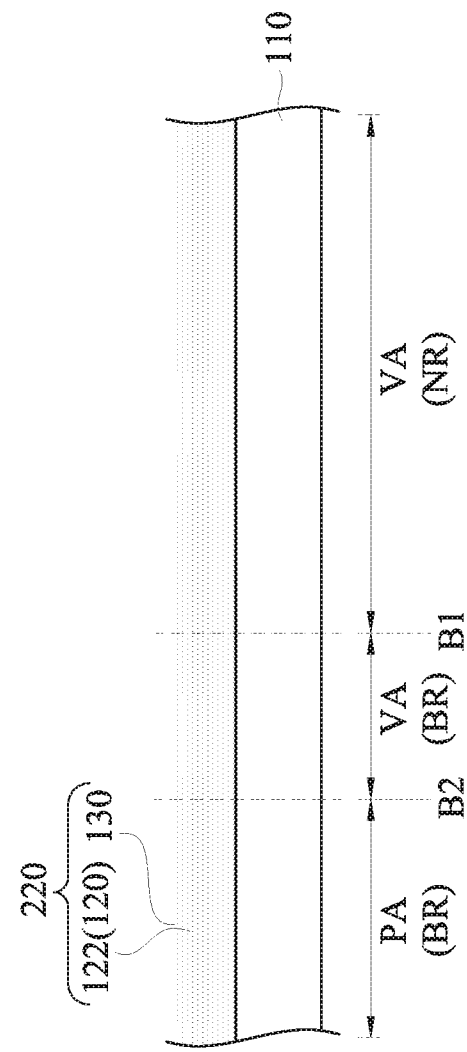

TOUCH PANEL, MANUFACTURING METHOD OF TOUCH PANEL, AND DEVICE THEREOF

BACKGROUND

Field of Disclosure

The present disclosure relates to a touch panel, a manufacturing method of the touch panel, and a device including the aforementioned touch panel.

Description of Related Art

In recent years, transparent conductors are often applied to many display or touch-related devices since transparent conductors can both transmit light and provide appropriate conductivity. In general, the transparent conductor may be a film made of various metal oxides, such as indium tin oxide (ITO) film, indium zinc oxide (IZO) film, cadmium tin oxide (CTO) film, or aluminum-doped zinc oxide (AZO) film. However, these metal oxide films cannot meet the flexibility requirements of display devices. Therefore, a variety of flexible transparent conductors have been developed, for example, a transparent conductor made of nano-scale materials.

However, there are still many problems for the process technology of the aforementioned nano-scale materials to be solved. For example, when using nanowires to manufacture touch electrodes, the touch electrodes must be connected to the traces made of metal in the peripheral area, and the overlapping area where the touch electrode and the trace are connected causes the size of the peripheral area to be unable to be reduced. As a result, the width of the peripheral area is too large to meet the requirement of the display with narrow bezel. As another example, due to the consideration of optical effects, the resistive capacitive loading (RC loading) value is larger for the touch electrodes made of nanowires, which is not convenient to general applications.

SUMMARY

According to some embodiments of the present disclosure, a touch panel includes a substrate, a peripheral trace, and a first touch sensing electrode. The substrate has a visible area and a peripheral area and has a bending area and a non-bending area. The peripheral trace is disposed on the peripheral area of the substrate. The first touch sensing electrode is disposed on the visible area of the substrate and has a first portion disposed on the bending area and a second portion disposed on the non-bending area. The first touch sensing electrode is electrically connected to the peripheral trace, and has a mesh pattern interlaced by a plurality of thin lines. The peripheral trace and the first touch sensing electrode each includes a plurality of conductive nanostructures and a film layer added onto the conductive nanostructures, and an interface between each of the conductive nanostructures and the film layer that are in the peripheral trace and in the second portion of the first touch sensing electrode substantially has a covering structure.

In some embodiments of the present disclosure, the covering structure includes a plating layer, and the plating layer completely covers the interface between each of the conductive nanostructures and the film layer.

In some embodiments of the present disclosure, the film layer is filled between adjacent conductive nanostructures of the conductive nanostructures, and the film layer does not have the covering structure that exists alone.

In some embodiments of the present disclosure, each of the conductive nanostructures includes a metal nanowire, the covering structure completely covers an interface between the metal nanowire and the film layer, and a covering layer is uniformly formed on the interface between the metal nanowire and the film layer.

In some embodiments of the present disclosure, the covering structure is a layered structure, an island-shaped protruding structure, a dot-shaped protruding structure, or combinations thereof made of a conductive material.

In some embodiments of the present disclosure, the conductive material includes silver, gold, copper, nickel, platinum, iridium, rhodium, palladium, osmium, or an alloy thereof.

In some embodiments of the present disclosure, the covering structure is a single-layer structure made of a single metal material or an alloy material, or a bilayer or multilayer structure made of two or more metal materials or alloy materials.

In some embodiments of the present disclosure, the covering structure is an electroless copper plating layer, an electroplating copper layer, an electroless copper-nickel plating layer, an electroless copper-silver plating layer, or combinations thereof.

In some embodiments of the present disclosure, each of the conductive nanostructures and the film layer are located in each of the first thin lines.

In some embodiments of the present disclosure, each of the conductive nanostructures, the film layer, and the covering structure are located in each of the first thin lines of the second portion of the first touch sensing electrode.

In some embodiments of the present disclosure, a boundary is between the bending area and the non-bending area, and a line width of each of the first thin lines crossing the boundary gradually increases from being far from the boundary to being close to the boundary.

In some embodiments of the present disclosure, each of the first thin lines crossing the boundary has a first portion far from the boundary and a second portion close to the boundary, a line width of the first portion is between 1 μm and 5 μm, and a line width of the second portion is between 5 μm and 30 μm.

In some embodiments of the present disclosure, a boundary is between the visible area in the bending area and the peripheral area, and a line width of each of the first thin lines adjacent the boundary gradually increases from being far from the boundary to being close to the boundary.

In some embodiments of the present disclosure, each of the first thin lines adjacent the boundary has a first portion far from the boundary and a second portion close to the boundary, a line width of the first portion is between 1 μm and 5 μm, and a line width of the second portion is between 5 μm and 30 μm.

In some embodiments of the present disclosure, the substrate has a first surface and a second surface facing away from each other, and the first touch sensing electrode is disposed on the first surface of the substrate. The touch panel further includes a second touch sensing electrode disposed on the second surface of the substrate and on the visible area, in which the second touch sensing electrode has a mesh pattern interlaced by a plurality of second thin lines.

In some embodiments of the present disclosure, the second touch sensing electrode has a first portion on the bending area and a second portion on the non-bending area. The second touch sensing electrode includes the conductive nanostructures and the film layer added onto each of the conductive nanostructures, and an interface between each of the conductive nanostructures and the film layer that are in the second portion of the second touch sensing electrode substantially has the covering structure.

In some embodiments of the present disclosure, the mesh pattern interlaced by the first thin lines is not completely overlapped with the mesh pattern interlaced by the second thin lines.

According to some other embodiments of the present disclosure, a manufacturing method of a touch panel includes: providing a substrate having a visible area and a peripheral area and having a bending area and a non-bending area; disposing a plurality of conductive nanostructures on the visible area and the peripheral area to form a conductive layer; adding a film layer onto the conductive layer, and making the film layer reach a pre-cured or incompletely cured state; performing a patterning step; and performing a modification step to form a covering structure on a surface of each of the conductive nanostructures located on the peripheral area and the non-bending area, such that an interface between each of the conductive nanostructures and the film layer that are in the peripheral trace and in the touch sensing electrode on the non-bending area substantially has the covering structure. The aforementioned patterning step includes: patterning the conductive layer and the film layer on the bending area and the visible area in the non-bending area to form a touch sensing electrode having a mesh pattern interlaced by a plurality of thin lines; and patterning the conductive layer and the film layer on the peripheral area to form a peripheral trace.

In some embodiments of the present disclosure, the patterning step is performed before the modification step.

In some embodiments of the present disclosure, patterning the conductive layer and the film layer on the visible area in the non-bending area and the peripheral area are performed in a same process.

In some embodiments of the present disclosure, the manufacturing method of a touch panel further includes: shielding the visible area in the bending area before the modification step.

In some embodiments of the present disclosure, the modification step includes: immersing the film layer and the conductive nanostructures into an electroless plating solution, such that the electroless plating solution penetrates into the film layer and contacts the conductive nanostructures, and a metal precipitates on the surface of each of the conductive nanostructures.

In some embodiments of the present disclosure, the covering structure is formed along the surface of each of the conductive nanostructures and is located on the interface between each of the conductive nanostructures and the film layer.

In some embodiments of the present disclosure, adding the film layer onto the conductive layer includes: coating a polymer on the conductive layer; and controlling curing conditions such that the polymer reaches the pre-cured or incompletely cured state.

In some embodiments of the present disclosure, adding the film layer onto the conductive layer includes: coating a polymer on the conductive layer; and controlling curing conditions such that the polymer reaches the pre-cured or incompletely cured state, in which the film layer in the pre-cured or incompletely cured state has a first layer area and a second layer area, and a cured state of the second layer area is greater than a cured state of the first layer area.

In some embodiments of the present disclosure, in the first layer area, the covering structure is formed along the surface of each of the conductive nanostructures and is located on the interface between each of the conductive nanostructures and the film layer.

In some embodiments of the present disclosure, controlling the curing conditions includes: introducing gas, and controlling a concentration of the gas in the first layer area and a concentration of the gas in the second layer area.

In some embodiments of the present disclosure, the modification step includes an electroless plating step, an electroplating step, or combinations thereof.

According to some other embodiments of the present disclosure, a device includes the aforementioned touch panel.

In some embodiments of the present disclosure, the device includes a display, a portable phone, a tablet, a wearable device, a car device, a notebook, or a polarizer.

According to the aforementioned embodiments of the present disclosure, since the peripheral trace located on the peripheral area and a portion of the touch sensing electrode located on the visible area in the touch panel of the present disclosure are formed of the modified metal nanowires, the surface resistance of the touch panel can be effectively reduced to enhance the conductivity of the touch panel, and the resistive capacitive loading value of the touch panel can be reduced. Furthermore, since the covering structure does not exist on the bending area, the bendability of the touch panel can be well maintained. On the other hand, since the touch sensing electrode on the visible area has the mesh pattern interlaced by multiple thin lines, the touch sensing electrode can prevent the light transmittance of the visible area from being affected by the modified metal nanowires. As a result, the visible area of the touch panel has good optical characteristics. Moreover, since the peripheral trace and touch sensing electrode can be manufactured in the same manufacturing process through the steps of deposition and patterning, the steps of overlapping and the space occupied by the overlapping can be omitted, thereby reducing the width of the peripheral of the touch panel, so as to meet the requirement for the display with narrow bezel.

BRIEF DESCRIPTION OF THE DRAWINGS

The disclosure can be more fully understood by reading the following detailed description of the embodiments, with reference made to the accompanying drawings as follows:

FIG. 1A to FIG. 1C are schematic cross-sectional views illustrating a modification method of metal nanowires in different steps according to some embodiments of the present disclosure;

FIG. 3A to FIG. 3D are schematic cross-sectional views illustrating a manufacturing method of the touch panel in different steps according to some embodiments of the present disclosure;

DETAILED DESCRIPTION

Figure 1B:
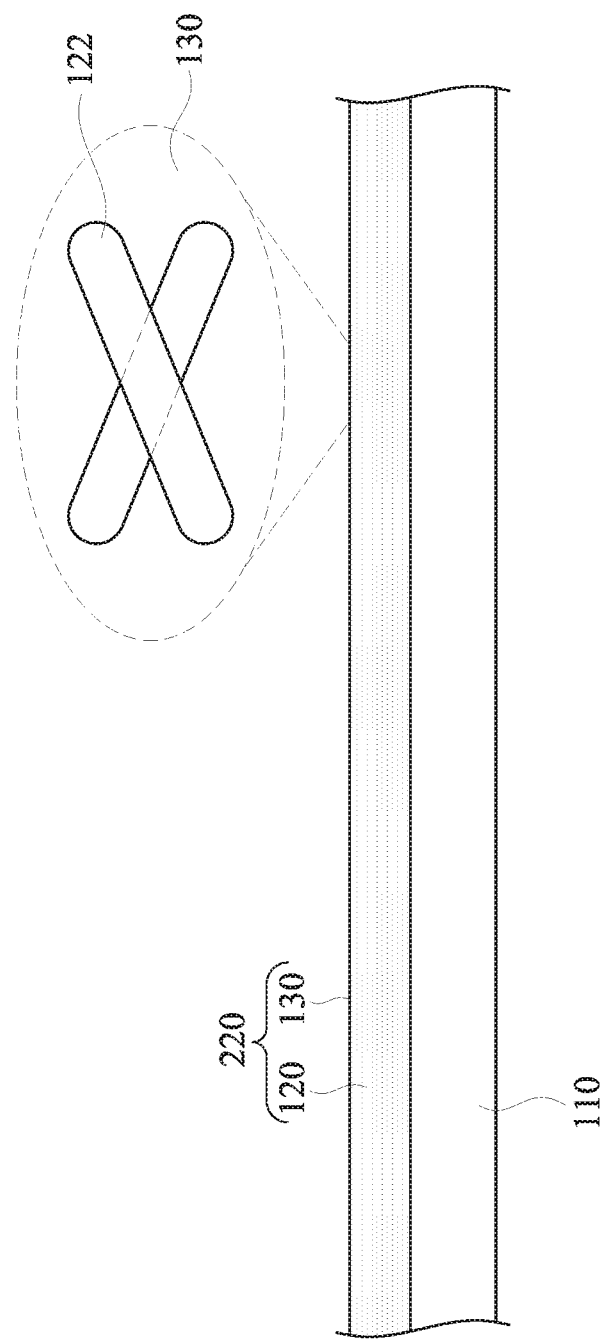

Reference will now be made in detail to the present embodiments of the disclosure, examples of which are illustrated in the accompanying drawings. Wherever possible, the same reference numbers are used in the drawings and the description to refer to the same or like parts.

In addition, relative terms such as "lower" or "bottom" and "upper" or "top" can be used herein to describe the relationship between one element and another element, as shown in the figure. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

Moreover, as used herein, "around", "about", or "approximately" shall generally mean within 20 percent, preferably within 10 percent, and more preferably within 5 percent of a given value or range. Numerical quantities given herein are approximate, meaning that the term "around", "about", or "approximately" can be inferred if not expressly stated.

It should be understood that the "conductive nanostructure" used in the present disclosure generally refers to a layer or film including nanostructures, and the surface resistance of the conductive nanostructure can be less than about 500 ohms per square, preferably less than about 200 ohms per square, and more preferably less than about 100 ohms per square. The aforementioned "nanostructure" generally refers to a structure with nanometer size, for example, the nanostructure has at least one directional dimension (such as wire diameter, length, width, or thickness) with nano-scale, and is a nano-scale linear structure, columnar structure, sheet structure, mesh structure, tubular structure, or combinations thereof.

The present disclosure provides a modification method of conductive nanostructures (e.g., metal nanowires) and a touch panel and device manufactured by using the modified conductive nanostructures. For clarity and convenience of description, in the present disclosure, the modification method of the conductive nanostructures will be described first, and the metal nanowires are taken as an example.

FIG. 1A to FIG. 1C are schematic cross-sectional views illustrating a modification method of metal nanowires in different steps according to some embodiments of the present disclosure. Reference is made to FIG. 1A. First, a substrate 110 is provided, and metal nanowires 122 are coated on a surface of the substrate 110 to form a metal nanowire layer 120. The metal nanowire layer 120 may be, for example, but not limitation, a silver nanowire layer, a gold nanowire layer, or a copper nanowire layer. In some embodiments, dispersion or slurry including the metal nanowires 122 can be coated on the substrate 110 and be cured/dried, such that the metal nanowires 122 are attached onto the surface of the substrate 110 to form the metal nanowire layer 120 disposed on the substrate 110. After the aforementioned curing/drying step, the solvent of the dispersion or slurry will volatilize, and the metal nanowires 122 can be distributed on the surface of the substrate 110 in a random manner, or preferably, the metal nanowires 122 can be fixed on the surface of the substrate 110 without falling off to form the metal nanowire layer 120. The metal nanowires 122 of the metal nanowire layer 120 can contact each other to provide a continuous current path, so as to form a conductive network. That is, the metal nanowires 122 contact each other at their intersection (overlapping) positions to form a path for transferring electrons. Taking the silver nanowires as an example, one silver nanowire and another silver nanowire form a direct contact at their intersection position, such that a low-resistance path for transferring electrons can be formed. In some embodiments, when the surface resistance of a region or structure is greater than about $10^8$ ohms per square, the region or structure can be considered as being electrically insulated, preferably greater than about $10^4$ ohms per square, about 3000 ohms per square, about 1000 ohms per square, about 350 ohms per square, or about 100 ohms per square. In some embodiments, the surface resistance of the silver nanowire layer formed of the silver nanowires is less than about 100 ohms per square.

Reference is made to FIG. 1B. Next, a film layer 130 is disposed to cover the metal nanowires 122, and a degree of curing of the film layer 130 is controlled. In some embodiments, a suitable polymer can be coated on the metal nanowires 122, such that the polymer with a fluid state/property can penetrate into the metal nanowires 122 to form a filler. As a result, the metal nanowires 122 are embedded into the film layer 130 to form a composite structure 220. On the other hand, the coating or curing conditions (e.g., temperature and/or photo-curing parameters) of the polymer can be controlled to make the polymer reach a pre-cured or incompletely cured state, or to further make the film layer 130 have different degrees of curing. For example, the degree of curing of the film layer 130 in the lower area (i.e., the area proximal to the substrate 110) can be adjusted to be greater than the degree of curing of the film layer 130 in the upper area (i.e., the area distal to the substrate 110), and the upper area is in the aforementioned pre-cured or incompletely cured state. In other words, in this step, the polymer is coated, such that the film layer 130 is added onto the metal nanowires 122, and the metal nanowires 122 are embedded into the film layer 130 in the pre-cured or incompletely cured state to form the composite structure 220.

In some embodiments, the film layer 130 may include an insulating material. For example, the insulating material may be a non-conductive resin or other organic materials, such as but not limited to polyacrylate, epoxy resin, polyurethane, polysiloxane, poly(silicon-acrylic), polyethylene, polypropylene, polyvinyl butyral, polycarbonate, acrylonitrile-butadiene-styrene copolymer, poly(3,4-ethylenedioxythiophene), poly(styrene sulfonic acid), or ceramic materials. In some embodiments, the film layer 130 may be formed by spin coating, spray coating, printing, or combinations thereof. In some embodiments, a thickness of the film layer 130 may be between about 20 nm and about 10 μm, about 50 nm and about 200 nm, or about 30 nm and about 100 nm; for example, the thickness of the film layer 130 may be about 90 nm or 100 nm. It should be understood that, in order to concisely and clearly describe the present disclosure, the metal nanowire layer 120 and the film layer 130 are shown as an entire structure layer in FIG. 1B, but the present disclosure is not limited in this regard. The metal nanowire layer 120 and the film layer 130 may also be combined into other types of structural layer (e.g., a stacked structure).

In some embodiments, the method for controlling the degree of curing of the polymer may be performed by utilizing the curing condition of different energy to make the film layer 130 reach the pre-cured or incompletely cured state. The degree of curing of the film layer 130 can be determined based on the variation of the bonding of the film layer 130 during curing. That is, the degree of curing of the film layer can be defined as the ratio of the bond strength of the film layer 130 to the bond strength of the fully-cured film layer 130 (which is expressed as percentage in the present embodiment). For example, for a film material of a commercial product, it is necessary to adopt the light energy of about 500 mJ in a low-oxygen environment for about 4 minutes to achieve complete curing. However, the present embodiment adopts the light energy of about 500 mJ in the low-oxygen environment for about 2 minutes, and the bond strength thereof measured by infrared spectroscopy is about 95% of the bond strength of the fully-cured film layer 130, which represents that the curing degree of the film layer reaches about 95% of the total curing amount. Therefore, the cured state of the film layer 130 obtained under this curing condition is defined as about 95% of the total curing amount.

In some embodiments, the film layer 130 can be controlled to have different curing states at different depths (i.e., thicknesses). Specifically, gas can be introduced during the curing of the film layer 130, in which the gas concentrations in the top and bottom of the film layer 130 are different, such that the phenomenon of "gas stops curing" occurs during the curing reaction in the top of the film layer 130, resulting in the film layer 130 having a first layer area and a second layer area with different curing degrees. For example, the second layer area may be located in the bottom of the film layer 130 and be an area with a higher degree of curing, and the first layer area may be located in the top of the film layer 130 and be an area with a lower degree of curing. In some embodiments, during curing, the concentration of the introduced gas (e.g., oxygen) and/or the given curing energy can be controlled to make the film layer 130 have different cured states at different depths. In some embodiments, the concentration of the gas may be, for example, about 20%, about 10%, about 3%, or less than about 1%, and the curing energy can be selected according to the material of the film layer 130, for example, the ultraviolet light energy of between about 250 mJ and about 1000 mJ. In some embodiments, the greater the gas concentration is, the more significant the phenomenon of "oxygen stops curing" occurred in the top of the film layer 130 is. As a result, the thickness of the first layer area becomes larger and the thickness of the second layer area becomes smaller. For example, the concentration of the introduced gas corresponding to the thickness of the first layer area from large to small is sequentially about 20%, about 10%, about 3%, and less than about 1%. In some embodiments, when the concentration of the introduced oxygen is about 20% and the applied curing energy is about 500 mJ, the curing degree of the first layer area is about 60%, and the thickness of the first layer area is about 23.4 nm (i.e., the thickness of the first layer area is about 12% of the total thickness of the film layer 130); the curing degree of the second layer area is between about 99% and about 100%, and the thickness of the second layer area is about 168.1 nm (i.e., the thickness of the second layer area is about 88% of the total thickness of the film layer 130). In some embodiments, when the concentration of the introduced oxygen is about 20% and the applied curing energy is about 1000 mJ, the thickness of the first layer area is about 8.8 nm (i.e., the thickness of the first layer area is about 5% of the total thickness of the film layer 130), and the thickness of the second layer area is about 195.9 nm (i.e., the thickness of the second layer area is about 95% of the total thickness of the film layer 130).

It is worth noting that the present disclosure focuses on the film layer 130 which is added onto the metal nanowires 122, and also focuses on controlling the curing degree or curing depth of the film layer 130 which can make the covering structure 140 (not shown in FIG. 1B, but instead shown in FIG. 1C) grow along the surface of the metal nanowires 122 and form on the interface between the metal nanowires 122 and the film layer 130 (which will be described in detail below). In the aforementioned step of coating the dispersion or slurry including the metal nanowires 122, the dispersion or slurry may also include polymers and similar compositions, but this is not the key point of the present disclosure. In some embodiments, the degree of curing of the film layer 130 can be controlled at about 0%, about 30%, about 60%, about 75%, about 95%, about 98%, about 0% to about 95%, about 0% to about 98%, about 95% to about 98%, about 60% to about 98%, or about 60% to about 75%. As mentioned above, the "pre-cured or incompletely cured" mentioned in the present disclosure can be defined as "the bond strength of the film layer being different from the bond strength of the fully-cured film layer". That is, when the ratio of the bond strength of the film layer to the bond strength of the fully-cured film layer is not 100%, it falls within the scope of the present disclosure.

Reference is made to FIG. 1C. Next, a modification step is performed to form the metal nanowire layer 120 including multiple modified metal nanowires 122. In detail, after the modification, at least a portion of the initial metal nanowires 122 are modified, such that a covering structure 140 is formed on the surface thereof, thereby forming the modified metal nanowires 122. It should be understood that different patterns are respectively used to represent the metal nanowires 122 before and after the modification in FIG. 1B and FIG. 1C, and the patterns as shown in FIG. 1B and FIG. 1C will be directly used in the following figures to respectively represent the metal nanowires 122 before and after the modification. In some embodiments, the covering structure 140 may be formed by electroless plating/electrolysis, and the covering structure 140 may be, for example, a layered structure, an island-shaped protruding structure, a dot-shaped protruding structure, or combinations thereof which include a conductive material. In some embodiments, the conductive material may include silver, gold, platinum, nickel, copper, iridium, rhodium, palladium, osmium, an alloy including the foregoing materials, or an alloy not including the foregoing materials. In some embodiments, a coverage rate of the covering structure 140 may be more than about 80%, about 90% to about 95%, about 90% to about 99%, or about 90% to 100% of the total surface area of the metal nanowires 122. It should be understood that when the covering rate of the covering structure 140 is said to be 100%, it means that the surfaces of the initial metal nanowires 122 are totally not exposed. In some embodiments, the covering structure 140 may be a single-layer structure made of a single conductive material, such as an electroless copper plating layer, an electroplating copper layer, or an electroless copper-nickel alloy plating layer; or the covering structure 140 may also be a bilayer or multilayer structure made of two or more conductive materials, for example, an electroless copper plating layer is formed first, and an electroless silver plating layer is formed thereafter.

In some embodiments, an electroless copper plating solution (including copper ion solution, chelating agent, alkali agent, reducing agent, buffering agent, stabilizing agent, etc.) can be prepared, and the metal nanowires 122 and the film layer 130 can be immersed into the electroless copper plating solution. The electroless copper plating solution can penetrate into the pre-cured or incompletely cured film layer 130 and contacts the surfaces of the metal nanowires 122 by capillary phenomenon. At the same time, the metal nanowires 122 can act as a catalytic point or nucleation point to facilitate the precipitation of copper, such that the electroless copper plating layer is deposited on the metal nanowires 122 to form the covering structure 140. The covering structure 140 substantially grows according to the initial shape of each metal nanowire 122 and forms a structure covering each metal nanowire 122 as the modification time increases. In contrast, there is no precipitation of copper in the composite structure 220 where there is no metal nanowire 122. That is, by well controlling, the whole covering structure 140 is formed on the interface between each metal nanowire 122 and the film layer 130, and the film layer 130 does not have the covering structure 140 that exists alone without contacting the surfaces of the metal nanowires 122. Therefore, after the modification step, each metal nanowire 122 of the conductive network is covered by the covering structure 140, and the covering structure 140 is located on the interface formed by each metal nanowire 122 and the film layer 130. In other words, the covering structure 140 is between each metal nanowire 122 and the film layer 130. The covering structure 140 and each metal nanowire 122 covered by the covering structure 140 can be regarded as an entirety, and the gaps between the entireties are occupied by the material of the film layer 130.

In some embodiments, the film layer 130 and the electroless plating solution/electrolyte solution may include materials that match with each other. For example, when a non-alkali-resistant polymer is being used to make the film layer 130, the electroless plating solution can be an alkaline solution. Therefore, in this step, in addition to utilizing the aforementioned pre-cured or incompletely cured state of the film layer 130, the electroless plating solution can further be utilized to attack (similar to etching) the pre-cured or incompletely cured film layer 130 to facilitate the aforementioned modification step.

The principle of the modification step is explained below, but the present disclosure is not limited in this regard. In the initial period when the metal nanowires 122 and the film layer 130 are immersed in the electroless plating solution/electrolyte solution, the solution first attacks the pre-cured or incompletely cured film layer 130. When the solution contacts the metal nanowires 122, the metal ions (e.g., copper ions) begin to grow by taking the metal nanowires 122 (e.g., the silver nanowires) as a seed crystal to begin to grow, and further grow into the aforementioned covering structure 140 on the surface of the metal nanowires 122 as the immersion time increases. On the other hand, the film layer 130 can act as a control layer or a limiting layer in the aforementioned reaction process to limit the growth of the covering structure 140 on the interface between each metal nanowire 122 and the film layer 130, such that the covering structure 140 can be controlled to grow uniformly. In this way, the modified metal nanowires 122 of the present disclosure can have better consistency when sensing/transmitting signals.

In some embodiments, a curing step can be performed thereafter to completely cure the film layer 130 by using light, heat, or other methods. In the aforementioned modification step, the covering structure 140 is formed on the surface of each metal nanowire 122, covers the entire surface of each metal nanowire 122, and grows outward. In some embodiments, a highly conductive material can be adopted to form the covering structure 140. For example, copper is adopted as the material of the covering structure 140 to cover the surface of the silver nanowires, and the covering structure 140 is located on the interface between each silver nanowire and the film layer 130. It is worth noting that although the conductivity of the silver is higher than the conductivity of the copper, the overall conductivity of the silver nanowire layer is lower (but the resistance is still low enough to transmit electrical signals) due to factors such as the size of each of the silver nanowires and their contact states. After the modification step, the conductivity of the silver nanowires covered by the covering structure 140 (i.e., the modified metal nanowires 122) is higher than the conductivity of the unmodified silver nanowires. In other words, the modified metal nanowire layer 120 can form a low-resistance conductive layer. Compared to the unmodified metal nanowire layer 120, the surface resistance of the modified metal nanowire layer 120 can be reduced by about 100 times to about 10,000 times. The aforementioned conductive layer can be used to make electrode structures for various applications, such as conductive substrates in the flexible field, wireless charging coils, or antenna structures. Specifically, the electrode structure may at least include the metal nanowires 122 and the film layer 130 that additionally covers the metal nanowires 122, and at least a portion of or an entirety of the surface of each metal nanowire 122 (i.e., the interface of the metal nanowires 122 corresponding to the film layer 130) has the covering structure 140 (i.e., the covering layer). By introducing the covering layer, the conductivity of the metal nanowire layer 120 can be enhanced. In some embodiments, since the copper material grows along the surface of each metal nanowire 122 (i.e., the interface of the metal nanowires 122 corresponding to the film layer 130), the shape of the observed copper is quite similar to the initial shape (e.g., a linear structure) of each metal nanowire 122 after plating, and the copper will grow uniformly to form an outer layer structure with a similar size (e.g., thickness).

Figure 2A:
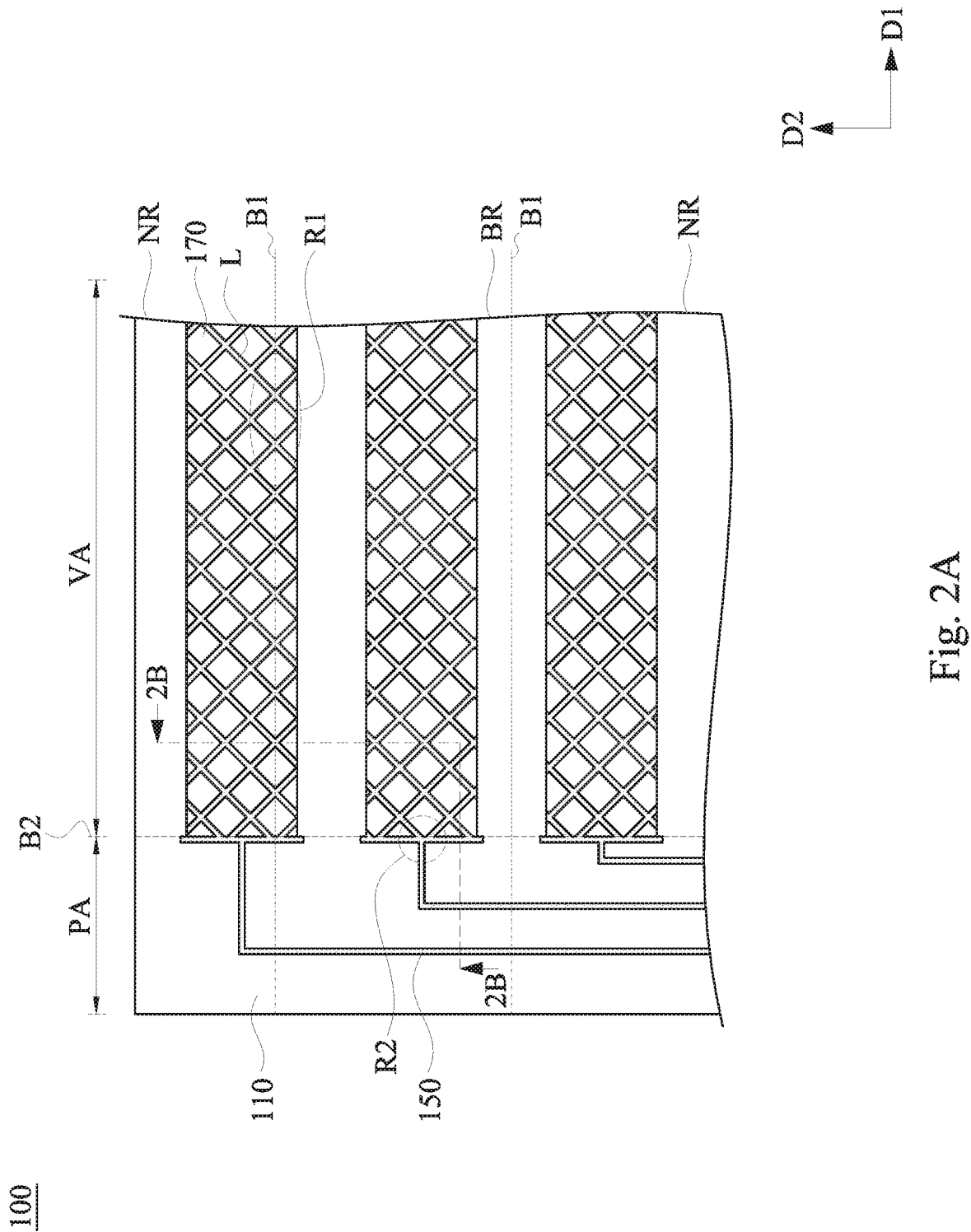
FIG. 2A is a schematic top view illustrating a touch panel according to some embodiments of the present disclosure.
Figure 2B:
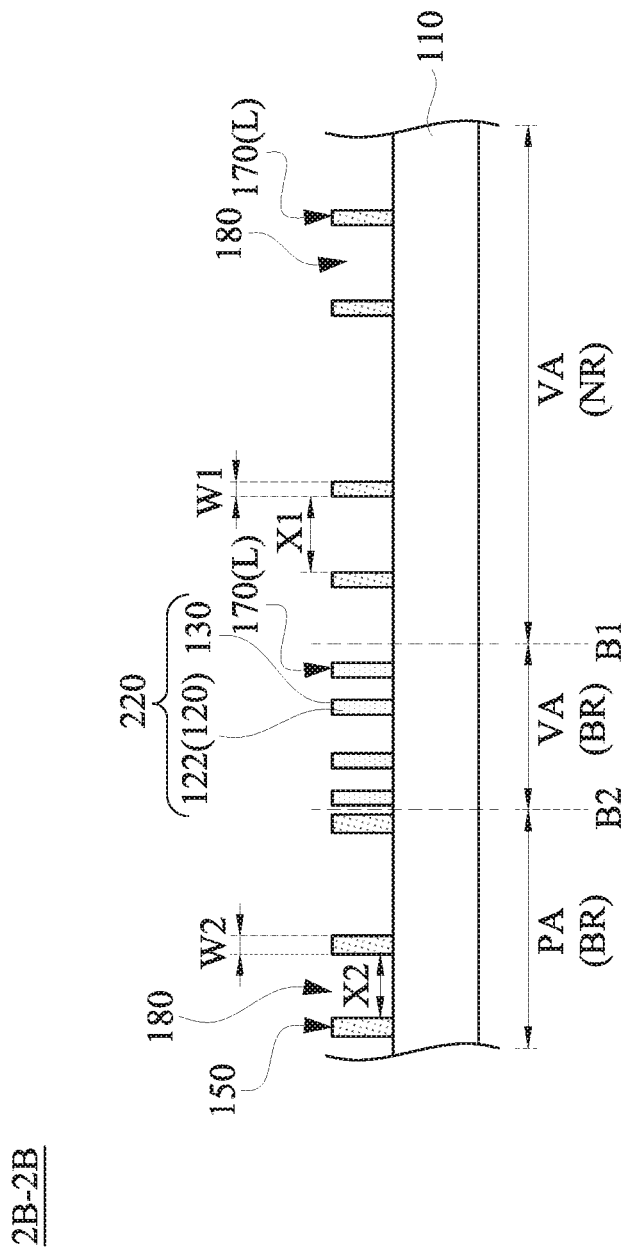
FIG. 2B is a schematic cross-sectional view illustrating the touch panel in FIG. 2A taken along the line 2B-2B according to some embodiments of the present disclosure.

The aforementioned method of the present disclosure can be applied to manufacturing a touch panel, such as but not limited to a touch panel collocated with a display. More specifically, references are made to FIG. 2A and FIG. 2B. FIG. 2A is a schematic top view illustrating a touch panel 100 according to some embodiments of the present disclosure, and FIG. 2B is a schematic cross-sectional view illustrating the touch panel 100 in FIG. 2A taken along the line 2B-2B according to some embodiments of the present disclosure. In some embodiments, the touch panel 100 may include a substrate 110, a peripheral trace 150, and a touch sensing electrode 170. The substrate 110 is configured to support the peripheral trace 150 and the touch sensing electrode 170, and may be, for example, a rigid transparent substrate or a flexible transparent substrate. In some embodiments, a material of the substrate 110 includes, but is not limited to, transparent materials such as glass, acrylic, polyvinyl chloride, polypropylene, polystyrene, polycarbonate, cycloolefin polymer, cycloolefin copolymer, polyethylene terephthalate, polyethylene naphthalate, colorless polyimide, or combinations thereof. In some embodiments, pre-treatment steps can be performed on the surface of the substrate 110, for example, a surface modification process is performed or an adhesive layer or a resin layer is additionally coated on the surface of the substrate 110 to enhance the adhesion between the substrate 110 and the metal nanowires 122.

In some embodiments, defined according to visibility, the substrate 110 may have a visible area VA and a peripheral area PA, and the peripheral area PA is disposed on the sides of the visible area VA. The visible area VA refers to an area that can be viewed by the user, the peripheral area PA refers to an area that cannot be viewed by the user, and a boundary B2 is located at a junction of the visible area VA and the peripheral area PA. For example, the peripheral area PA may be a frame-shaped area disposed around (i.e., including the right, left, upper and lower sides of) the visible area VA. For another example, the peripheral area PA may also be an L-shaped area disposed on the left and lower sides of the visible area VA. In some embodiments, if defined according to bendability, the substrate 110 has a bending area BR and a non-bending area NR, and the bending area BR may be sandwiched by the non-bending area NR (e.g., the bending area BR being sandwiched by the non-bending area NR from the upper and lower sides), in which a boundary B1 is located at a junction of the bending area BR and the non-bending area NR. The bending area BR, as described herein, may be, for example, a bendable area defined by a design of a flexible device when the touch panel 100 is integrated into the flexible device. In general, an area of the bending area BR is smaller than an area of the non-bending area NR. A partial area of the peripheral area PA and a partial area of the visible area VA overlap the bending area BR, and a partial area of the peripheral area PA and a partial area of the visible area VA overlap the non-bending area NR.

In some embodiments, the touch sensing electrode 170 is approximately located on the visible area VA, in which a portion of the touch sensing electrode 170 is located on the bending area BR, and another portion of the touch sensing electrode 170 is located on the non-bending area NR. In some embodiments, the touch sensing electrode 170 is arranged in a non-interlaced manner. For example, the touch sensing electrode 170 may be a strip-shaped electrode extending along a first direction D1, and multiple strip-shaped electrodes may be arranged equidistantly along a second direction D2, in which the first direction D1 and the second direction D1 are perpendicular to each other. However, the shape and arrangement of the touch sensing electrode 170 are not limited in this regard. In other embodiments, the touch sensing electrode 170 may also have other appropriate shapes and arrangements. In some embodiments, one strip-shaped electrode may cross the bending area BR and the non-bending area NR (e.g., the uppermost strip-shaped electrode in FIG. 2A), be completely located in the bending area BR (e.g., the middle strip-shaped electrode in FIG. 2A), or be completely located in the non-bending area NR (e.g., the bottommost strip-shaped electrode in FIG. 2A). In some embodiments, the touch sensing electrode 170 adopts a single-layer configuration, and the touch panel 100 can obtain the touch position by detecting the change in the capacitance of each touch sensing electrode 170.

In some embodiments, the peripheral trace 150 is approximately located on the peripheral area PA, and the peripheral trace 150 and the touch sensing electrode 170 are in contact with each other approximately at the boundary (boundary B2) between the visible area VA and the peripheral area PA, so as to be electrically connected to each other to form an electron transfer path across the visible area VA and the peripheral area PA.

In some embodiments, the peripheral trace 150 and the touch sensing electrode 170 on the non-bending area NR include the modified metal nanowires 122 (the referenced "modified metal nanowires 122" herein includes the metal nanowires 122 and the covering structure 140 that covers the surface thereof). In detail, each of the peripheral trace 150 and the touch sensing electrode 170 on the non-bending area NR includes the metal nanowires 122 and the film layer 130 added onto the metal nanowires 122, and the interface between each metal nanowire 122 and the film layer 130 substantially has the covering structure 140. Specifically, the aforementioned modified metal nanowires 122 and the film layer 130 added onto the modified metal nanowires 122 are patterned to form the peripheral trace 150 and the touch sensing electrode 170 on the non-bending area NR. By forming the covering structures 140 on the interfaces between the metal nanowires 122 and the film layer 130, the modified metal nanowires 122 are formed. By using the modified metal nanowires 122 to manufacture the peripheral trace 150 and the touch sensing electrode 170 on the non-bending area NR of the touch panel 100, the surface resistance of the touch panel 100 can be effectively reduced to enhance the conductivity of the touch panel 100, and the resistive capacitive loading (RC loading) value of the touch panel 100 can be effectively reduced. In some embodiments, compared to the touch sensing electrode 170 made of the unmodified metal nanowires 122 (i.e., the metal nanowires 122 without the covering structure 140 on the surface thereof), the resistive capacitive loading value of the touch sensing electrode 170 made of the modified metal nanowires 122 is reduced by about 10% to about 50%.

In some embodiments, the touch sensing electrode 170 located on the bending area BR includes the unmodified metal nanowires 122. In detail, the touch sensing electrode 170 on the bending area BR includes the initial metal nanowires 122 and the film layer 130 added onto to the initial metal nanowires 122. Specifically, the unmodified metal nanowires 122 and the film layer 130 added onto the unmodified metal nanowires 122 are patterned to form the touch sensing electrode 170 on the bending area BR. It is worth noting that the unmodified metal nanowires 122 (e.g., silver nanowire) can have better bendability than the modified metal nanowires 122 (e.g., silver nanowire covered by copper metal material). Therefore, by using the unmodified metal nanowires 122 to fabricate the touch sensing electrode 170 on the bending area BR, the touch panel 100 can maintain good bendability. On the other hand, although the touch sensing electrode 170 made of the modified metal nanowires 122 has a lower resistive capacitive loading value than the touch sensing electrode 170 made of the unmodified metal nanowires 122, the touch sensing electrode 170 can have sufficient conductivity to transmit touch sensing signals no matter whether the touch sensing electrode 170 is made of the modified or unmodified metal nanowires 122.

In some embodiments, the touch sensing electrode 170 has a mesh pattern interlaced by multiple thin lines L. In detail, on the non-bending area NR, the modified metal nanowires 122 and the film layer 130 added onto the modified metal nanowires 122 are patterned to form the mesh pattern interlaced by multiple thin lines L, and the formed mesh pattern is the electrode pattern of the touch sensing electrode 170. On the bending area BR, the unmodified metal nanowires 122 and the film layer 130 added onto the unmodified metal nanowires 122 are patterned to form the mesh pattern interlaced by multiple thin lines L, and the formed mesh pattern is the electrode pattern of the touch sensing electrode 170. In other words, the modified metal nanowires 122 and the film layer 130 added onto the modified metal nanowires 122 exist in each thin line L of the touch sensing electrode 170 on the non-bending area NR, and the unmodified metal nanowires 122 and the film layer 130 added onto the unmodified metal nanowires 122 exist in each thin line L of the touch sensing electrode 170 on the bending area BR. When one touch sensing electrode 170 crosses the boundary B1 of the bending area BR and the non-bending area NR, the thin line L that crosses the boundary B1 can include both the unmodified metal nanowires 122 and the modified metal nanowires 122. In more detail, when one metal nanowire 122 in one thin line L crosses the boundary B1 between the bending area BR and the non-bending area NR, the one metal nanowire 122 that crosses the boundary B1 may be partially modified, that is, a portion of the metal nanowire 122 may be covered by the covering structure 140 (i.e., being modified), while another portion of the metal nanowire 122 is not covered by the covering structure 140 (i.e., not being modified).

It is worth noting that, since the modified metal nanowire 122 has the covering structure 140, it has lower light transmittance (i.e., a transmittance of visible light with the wavelength of about 400 nm to about 700 nm) and higher haze than the light transmittance and the haze of the unmodified metal nanowire 122. By patterning the touch sensing electrode 170 to form the mesh pattern interlaced by multiple thin lines L, the modified metal nanowires 122 can be prevented from affecting the light transmittance and haze of the touch sensing electrode 170, such that the visible area VA of the touch panel 100 can maintain good optical characteristics. Specifically, the touch sensing electrode 170 with the mesh pattern in the present disclosure can make the visible area VA of the touch panel 100 have light transmittance greater than about 88%, which meets the needs of users. On the other hand, the touch sensing electrode 170 with the mesh pattern in the present disclosure can make the visible area VA of the touch panel 100 have haze of less than about 3.0, and preferably less than about 2.5, about 2.0, or about 1.5.

In some embodiments, a line width W1 of each thin line L is between about 1 μm and about 10 μm, so as to provide better light transmittance of the touch sensing electrode 170 and convenience of patterning. In detail, when the line width W1 of each thin line L is greater than about 10 μm, the touch sensing electrode 170 may have poor light transmittance, so as to affect the optical characteristics of the visible area VA of the touch panel 100. When the line width W1 of each thin line L is less than about 1 μm, the difficulty of patterning may be increased, which may cause inconvenience in the manufacturing process. In some embodiments, a distance X1 between adjacent thin lines L (i.e., a line spacing X1) is between about 1 μm and about 10 μm to provide the touch sensing electrode 170 with better light transmittance and conductivity. In detail, when the line spacing X1 is greater than about 10 μm, the arrangement of the mesh pattern may be too sparse, which results in insufficient electron transfer paths, and thus the surface resistance of the touch sensing electrode 170 is too large and the conductivity is too low. When the line spacing X1 is less than about 1 μm, the arrangement of the mesh pattern may be too dense, which results in low light transmittance of the touch sensing electrode 170, and thus the optical characteristics shown by the visible area VA of the touch panel 100 is influenced. In some embodiments, the thin lines L may be arranged equidistantly. That is, each mesh may have the same size (e.g., length and width). In some embodiments, the shape of each mesh may be, for example, a rectangle, a square, a diamond, or other suitable shapes. With the aforementioned arrangement, the touch sensing electrode 170 of the present disclosure not only has good light transmittance but also has good conductivity. Specifically, the surface resistance of the touch sensing electrode 170 with the mesh pattern made of the modified metal nanowires 122 on the non-bending area NR is between about 8 ohms per square and about 42 ohms per square. Compared to the surface resistance of the touch sensing electrode 170 with the mesh pattern made of the unmodified metal nanowires 122 on the bending area BR, the surface resistance of the touch sensing electrode 170 with the mesh pattern made of the modified metal nanowires 122 on the non-bending area NR is reduced by about 20% to about 30%.

Figure 2D:
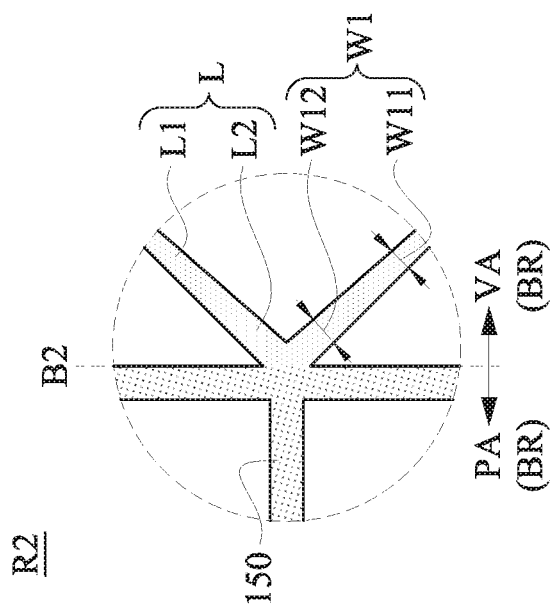
FIG. 2D is a schematic partial enlargement view illustrating the region R2 of the touch panel in FIG. 2A according to some embodiments of the present disclosure.
Figure 2C:
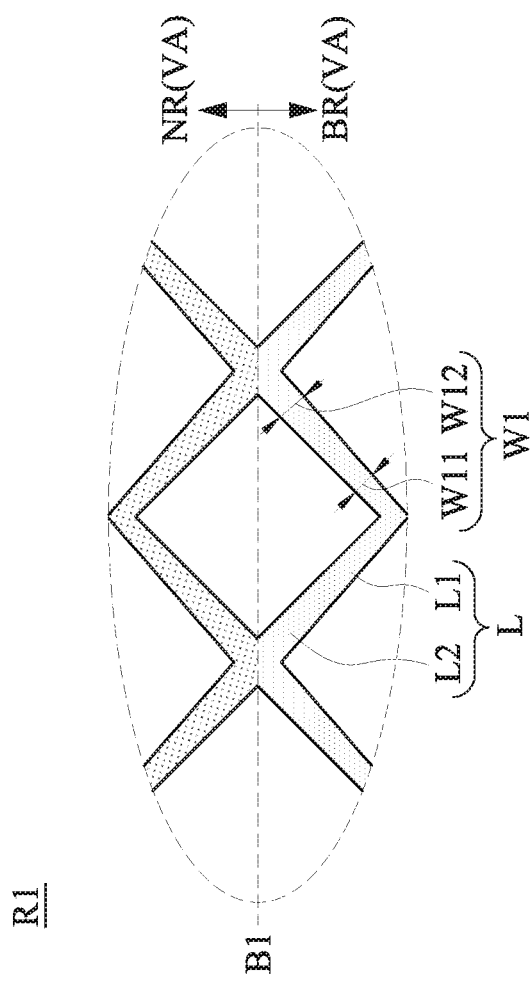
FIG. 2C is a schematic partial enlargement view illustrating the region R1 of the touch panel in FIG. 2A according to some embodiments of the present disclosure.

In some embodiments, the thin line L that crosses the boundary B1 of the bending area BR and the non-bending area NR of the touch sensing electrode 170 may have an uneven line width W1. In detail, please refer to FIG. 2C, which is a schematic partial enlargement view illustrating the region R1 of the touch panel 100A in FIG. 2A according to some embodiments of the present disclosure. As shown in FIG. 2C, the thin line L crossing the boundary B1 of the bending area BR and the non-bending area NR has a first portion L1 further from the boundary B1 and a second portion L2 closer to the boundary B1, in which the first portion L1 and the second portion L2 are connected, and a line width W11 of the first portion L1 is smaller than a line width W12 of the second portion L2. In more detail, the line width W11 of the first portion L1 is between 1 μm and 5 μm, and the line width W12 of the second portion L2 is between 5 μm and 30 μm. Since the bending area BR is provided with the unmodified metal nanowires 122 and the non-bending area NR is provided with the modified metal nanowires 122, the design of the uneven line width W1 of the thin line L can avoid the circuit (thin line L) from being open between the bending area BR and the non-bending area NR after multiple times of bending and ensure that the visible area VA has good optical characteristics (e.g., high light transmittance). In some embodiments, the line width W1 of the thin line L that crosses the boundary B1 gradually increases and then gradually decreases at a fixed extent, that is, a linear gradual design is adopted. In more detail, the line width W1 of the thin line L that crosses the boundary B1 gradually increases from being far from the boundary B1 to being close to the boundary B1 on the bending area BR and gradually decreases from being close to the boundary B1 to being far from the boundary B1 on the non-bending area NR. Accordingly, the thin line L that crosses the boundary B1 has a largest line width W1 at the position that contacts the boundary B1. Since the line width W1 of the thin line L decreases (or increases) by a fixed extent, it is possible to prevent the thin line L from being open due to a sudden decrease (or sudden increase) of the line width W1. On the other hand, the thin line L that does not cross the boundary B1 may have a fixed line width W1 (as shown in FIG. 2A).

References is made back to FIG. 2A. The thin line L in the touch sensing electrode 170 adjacent to the boundary B2 between the visible area VA and the peripheral area PA may also have an uneven line width W1. In detail, please refer to FIG. 2D, which is a schematic partial enlargement view illustrating the region R2 of the touch panel 100A in FIG. 2A according to some embodiments of the present disclosure. As shown in FIG. 2D, on the bending area BR, the thin line L adjacent the boundary B2 of the visible area VA and the peripheral area PA has a first portion L1 further from the boundary B2 and a second portion L2 closer to the boundary B2, in which the first portion L1 and the second portion L2 are connected, and a line width W11 of the first portion L1 is smaller than a line width W12 of the second portion L2. In more detail, the line width W11 of the first portion L1 is between 1 μm and 5 μm, and the line width W12 of the second portion L2 is between 5 μm and 30 μm. Since the visible area VA in the bending area BR is provided with the unmodified metal nanowires 122 and the peripheral area PA in the bending area BR is provided with the modified metal nanowires 122, the design of the uneven line width W1 of the thin line L can avoid the circuit (thin line L) on the bending area BR from being open between the visible area VA and the peripheral area PA after multiple times of bending and ensure that the visible area VA has good optical characteristics (e.g., high light transmittance). In some embodiments, the line width W1 of the thin line L adjacent the boundary B2 gradually increases at a fixed extent, that is, a linear gradual design is adopted. In more detail, the line width W1 of the thin line L on the peripheral area PA adjacent the boundary B2 gradually increases from being far from the boundary B2 to being close to the boundary B2, and the thin line L extends to the boundary B2 to be connected to the peripheral trace 150, such that the thin line L has a largest line width W1 at the position that contacts the boundary B2 (i.e., the position where the thin line L is connected to the peripheral trace 150). Since the line width W1 of the thin line L decreases (or increases) by a fixed extent, it is possible to prevent the thin line L from being open due to a sudden decrease (or sudden increase) of the line width W1. On the other hand, the thin line L that is not adjacent the boundary B2 may have a fixed line width W1.

References are made back to FIG. 2A and FIG. 2B. A line width W2 of the peripheral trace 150 is between about 8 μm and about 10 μm, such that the peripheral trace 150 has good conductivity and provides convenience of patterning. In detail, when the line width W2 of the peripheral trace 150 is less than about 8 μm, the surface resistance of the peripheral trace 150 may be too large and the conductivity may be too low, and the line width W2 of less than about 8 μm may increase the difficulty of patterning, which results in inconvenience in the manufacturing process. In some embodiments, the line width W2 of the peripheral trace 150 can be designed to be the same as the line width W1 of a portion of the thin lines L (the thin lines L that are not adjacent the boundaries B1, B2) of the touch sensing electrode 170. In some embodiments, a distance X2 between adjacent peripheral traces 150 (i.e., a line spacing X2) is between about 5 μm and about 20 μm or preferably between 3 μm and about 20 μm. As a result, compared with the conventional touch panel, the touch panel 100 of the present disclosure reduces the bezel size (e.g., the width of the peripheral area PA) by about 20% or more, and thus the narrow bezel requirement of the display is achieved. Specifically, the width of the peripheral area PA of the touch panel 100 in the present disclosure may be less than about 2 mm. With the aforementioned arrangement, the peripheral trace 150 of the present disclosure can have good conductivity. Specifically, the peripheral trace 150 of the present disclosure can make the surface resistance of the peripheral area PA of the touch panel 100 be between about 0.10 ohm per square and about 0.13 ohm per square. Compared to the surface resistance of the peripheral area PA of the touch panel formed by the unmodified metal nanowires 122, the surface resistance of the peripheral area PA of the touch panel 100 formed by the modified metal nanowires 122 is reduced by about 20% to about 50%.

References are made to FIG. 3A to FIG. 3D, which are schematic cross-sectional views illustrating a manufacturing method of the touch panel 100 in different steps according to some embodiments of the present disclosure, in which the position of the cross section thereof is the same as that in FIG. 2B. The manufacturing method of the touch panel 100 includes step S10 to step S16, and step S10 to step S16 can be performed sequentially. In step S10, a substrate 110 with a predefined peripheral area PA and a predefined visible area VA as well as a predefined bending area BR and a predefined non-bending area NR is provided, and unmodified metal nanowires 122 are disposed on the substrate 110 to form a metal nanowire layer 120 on the peripheral area PA and the visible area VA (including the area in the bending area BR and the non-bending area NR). In step S12, a film layer 130 is disposed on the unmodified metal nanowire 122, such that the film layer 130 covers the unmodified metal nanowire 122, in which the film layer 130 is in a pre-cured or incompletely cured state. In step S14, a patterning step is performed to form a patterned metal nanowire layer 120, in which the metal nanowire layer 120 located on the peripheral area PA is patterned to form a peripheral trace 150, and the metal nanowire layer 120 located on the visible area VA (including the area in the bending area BR and the non-bending area NR) is patterned to form a touch sensing electrode 170. In step S16, a modification step is performed to form a covering structure 140 on a portion of the metal nanowires 122, such that the peripheral trace 150 located on the peripheral area PA and the touch sensing electrode 170 located on the non-bending area NR include the modified metal nanowires 122, and the touch sensing electrode 170 located on the bending area BR includes the unmodified metal nanowires 122. In the following description, the aforementioned steps are described in more detail.

Reference is made to FIG. 3A. The metal nanowire layer 120 (e.g., a silver nanowire layer, a gold nanowire layer, or a copper nanowire layer) at least including metal nanowires 122 is coated on the peripheral area PA and the visible area VA (including the area located in the bending area BR and the non-bending area NR) of the substrate 110. In some embodiments, dispersion or slurry having the metal nanowires 122 may be formed on the substrate 110 by coating and be cured/dried, such that the metal nanowires 122 are attached onto a surface of the substrate 110 to form the metal nanowire layer 120 disposed on the substrate 110. After the aforementioned curing/drying step, the solvent of the dispersion or slurry will volatilize, and the metal nanowires 122 can be distributed on the surface of the substrate 110 in a random manner; or preferably, the metal nanowires 122 can be fixed on the surface of the substrate 110 without falling off to form the metal nanowire layer 120. The metal nanowires 122 of the metal nanowire layer 120 can contact each other to provide a continuous current path, so as to form a conductive network. In other words, the metal nanowires 122 contact each other at their intersection positions to form a path for transferring electrons. Taking the silver nanowires as an example, one silver nanowire and another silver nanowire will form a direct contact at their intersection position (i.e., the silver-silver contact interface), such that a low-resistance electron transferring path can be formed. The subsequent modification steps do not affect or change the low-resistance structure of the "silver-silver contact" mentioned above, but further covers the covering structure 140 having high conductivity on the surface of the metal nanowires 122 to improve the electrical characteristics of the final product.

In some embodiments, the dispersion or slurry includes a solvent, such that the metal nanowires 122 are uniformly dispersed in the solvent. Specifically, the solvent is, for example, water, alcohols, ketones, ethers, hydrocarbons, aromatic solvents (benzene, toluene, xylene, etc.), or combinations thereof. In some embodiments, the dispersion may further include additives, surfactants, and/or binding agents to improve the compatibility between the metal nanowires 122 and the solvent and the stability of the metal nanowires 122 in the solvent. Specifically, the additives, surfactants, and/or binding agents may be, for example, carboxymethyl cellulose, hydroxyethyl cellulose, hypromellose, fluorosurfactant, sulfosuccinate sulfonate, sulfate, phosphate, disulfonate, or combinations thereof. The dispersion or slurry including the metal nanowires 122 can be formed on the surface of the substrate 110 in any manner, such as but not limited to processes such as screen printing, spray coating, or roller coating. In some embodiments, a roll-to-roll process may be performed, such that the dispersion or slurry including the metal nanowires 122 is coated on the surface of the substrate 110 supplied continuously.

It should be understood that the phrase "metal nanowire" used herein is a collective noun, which refers to a collection of metal wires that include multiple metal elements, metal alloys, or metal compounds (including metal oxides), and the number of metal nanowires included therein does not affect the scope of the present disclosure. In some embodiments, a cross-sectional size (e.g., a diameter of the cross section) of a single metal nanowire can be less than 500 nm, preferably less than 100 nm, and more preferably less than 50 nm. In some embodiments, the metal nanowire has a large aspect ratio (i.e., length:diameter of the cross section). Specifically, the aspect ratio of the metal nanowire may be between 10 and 100,000. In more detail, the aspect ratio of the metal nanowire may be greater than 10, preferably greater than 50, and more preferably greater than 100. Moreover, other terms such as silk, fiber, or tube also have the aforementioned cross-sectional dimensions and aspect ratios, which also fall within the scope of the present disclosure.

In some embodiments, post-treatments may be further performed on the metal nanowires 122 to improve the contact characteristics (e.g., increase the contact area) of the metal nanowires 122 at their intersection positions, so as to enhance the conductivity. The post-treatments may include steps such as, but not limited to, heating, plasma providing, corona discharging, ultraviolet providing, ozone providing, or pressurizing. Specifically, after the metal nanowire layer 120 is formed by curing/drying, a roller may be used to apply pressure thereon. In some embodiments, one or more rollers may be used to apply pressure onto the metal nanowire layer 120. In some embodiments, the applied pressure may be between about 50 psi and about 3400 psi, preferably between about 100 psi and about 1000 psi, between about 200 psi and about 800 psi, or between about 300 psi and about 500 psi. In some embodiments, the heating and pressurizing steps of the post-treatments can be performed on the metal nanowires 122 at the same time. For example, a pressure of about 10 psi to about 500 psi (or preferably a pressure of about 40 psi to about 100 psi) can be applied through the roller, and the roller can be heated to about 70° C. to about 200° C. (or preferably about 100° C. to about 175° C.) to enhance the conductivity of the metal nanowires 122. In some embodiments, the metal nanowires 122 may be exposed to a reducing agent for the post-treatment. For example, the metal nanowires 122 including silver nanowires may preferably be exposed to a silver reducing agent for the post-treatment. In some embodiments, the silver reducing agent may include a borohydride such as sodium borohydride, a boron nitrogen compound such as dimethylamine borane, or a gas reducing agent such as hydrogen. In some embodiments, the exposure time may be between about 10 seconds and about 30 minutes, preferably between about 1 minute and about 10 minutes. Through the aforementioned post-treatments, the contact strength or area of the metal nanowires 122 at their intersection positions can be strengthened, so as to ensure that the contact surfaces of the metal nanowires 122 at their intersection positions are not affected by the modification treatment.

Next, reference is made to FIG. 3B. The film layer 130 is disposed on the unmodified metal nanowires 122, such that the film layer 130 covers the unmodified metal nanowires 122. In some embodiments, the polymer in the film layer 130 after coating can penetrate into the metal nanowires 122 to form a filler, and the metal nanowires 122 are embedded into the film layer 130 to form a composite structure 220. In other words, the unmodified metal nanowires 122 are embedded into the film layer 130 to form the composite structure 220. In some embodiments, the film layer 130 may include an insulating material, such as a non-conductive resin or other organic materials. In some embodiments, the film layer 130 may be formed by spin coating, spray coating, or printing. In some embodiments, a thickness of the film layer 130 may be between about 20 nm and about 10 μm, about 50 nm and about 200 nm, or about 30 nm and about 100 nm. In order to effectively perform the subsequent modification steps, the polymer (i.e., the film layer 130) will be in the pre-cured or incompletely cured state, as previously described.

Figure 3C:
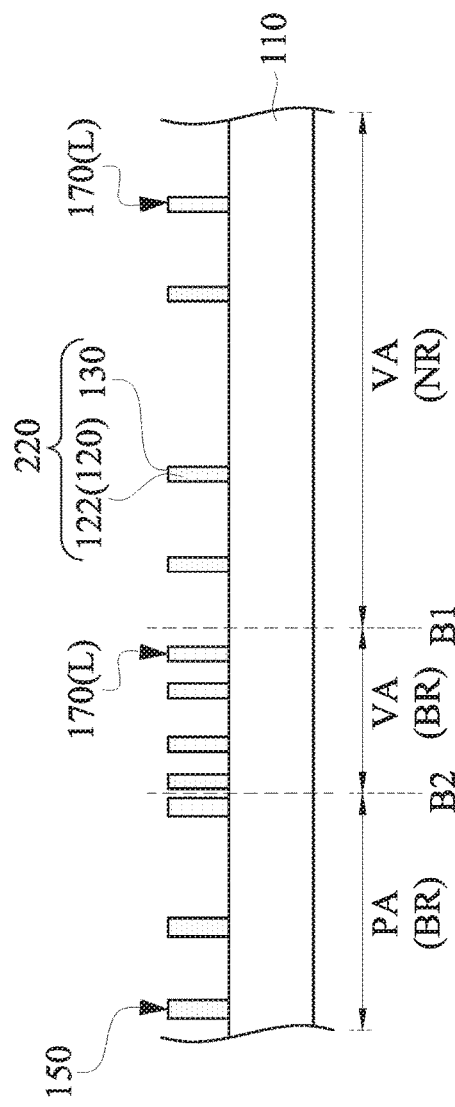

Next, reference is made to FIG. 3C. A patterning step is performed to define the patterns of the composite structure 220 located on the peripheral area PA and the visible area VA, so as to form the conductive structures located on the peripheral area PA and the visible area VA. In some embodiments, the patterned composite structure 220 made on the peripheral area PA can form the peripheral trace 150, and the patterned composite structure 220 made on the visible area VA can form the touch sensing electrode 170. The peripheral trace 150 and the touch sensing electrode 170 can be electrically connected to each other for signal transmission between the peripheral area PA and the visible area VA. In some embodiments, the composite structure 220 located on the visible area VA may be patterned into a mesh pattern with multiple interlaced thin lines L, such that the visible area VA has good light transmittance. After the patterning step, the peripheral trace 150 and the touch sensing electrode 170 may at least include the metal nanowire layer 120 formed of the unmodified metal nanowires 122.

In some embodiments, the composite structure 220 may be patterned by etching. In some embodiments, the composite structure 220 located on the peripheral area PA and the visible area VA can be etched at the same time, and an etching mask (e.g., photoresist) can be used to make the patterned composite structure 220 on the peripheral area PA and the visible area VA at one time in the same process. In some embodiments, when the metal nanowire layer 120 of the composite structure 220 is the silver nanowire layer, a component that can etch silver can be selected for being the etching solution. For example, the main component of the etching solution can be $H_3PO_4$ (with a ratio of about 55 wt % to about 70 wt %) and $HNO_3$ (with a ratio of about 5 wt % to about 15 wt %) to remove the silver material in the same process. In other embodiments, the main component of the etching solution may be ferric chloride/nitric acid or phosphoric acid/hydrogen peroxide.

Figure 3D:
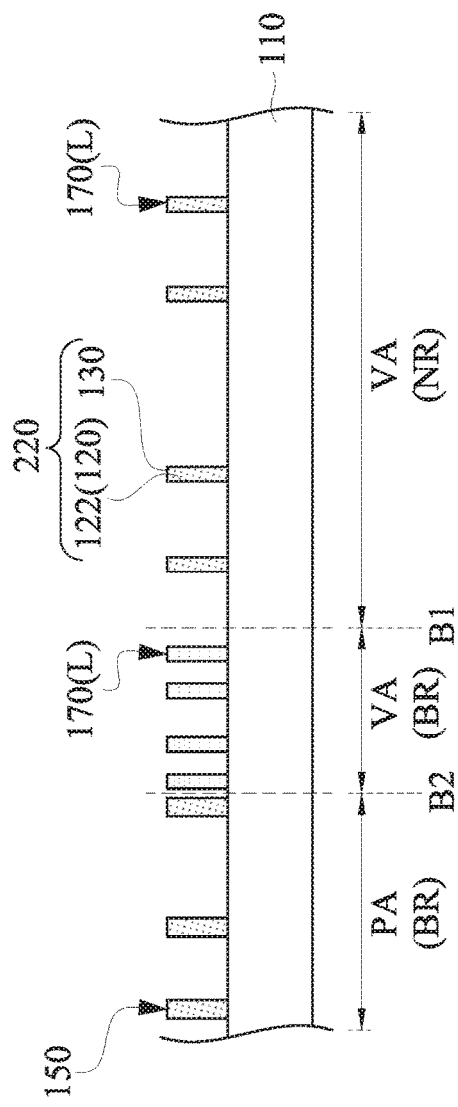

Next, reference is made to FIG. 3D. A modification step is performed to form the metal nanowire layer 120 including multiple modified metal nanowires 122 on the peripheral area PA and the visible area VA in the non-bending area NR. A photoresists, a peelable adhesive, or a similar material layer may be adopted during the modification step to cover the visible area VA in the bending area BR, such that the metal nanowire layer 120 on the visible area VA in the bending area BR is shielded, and the modification step is only performed on the metal nanowire layer 120 on the peripheral area PA and the non-bending area NR. In detail, after the modification step, at least a portion of the metal nanowires 122 of the metal nanowire layer 120 located on the peripheral area PA and the non-bending area NR is modified, such that the covering structure 140 is formed on the surfaces of the portion of the metal nanowires 122, thereby forming the modified metal nanowires 122. In some embodiments, the covering structure 140 can be formed by electroless plating, that is, the electroless plating solution is used to penetrate into the pre-cured or incompletely cured film layer 130, such that the reactive metal ions in the electroless plating solution precipitate onto the surfaces of the metal nanowires 122 by oxidation-reduction reaction to form the covering structure 140. The covering structure 140 may be a layered structure, an island-shaped protruding structure, a dot-shaped protruding structure, or combinations thereof which are made of conductive materials; or the covering structure 140 may be a single-layer or a multi-layer structure made of a single material or multiple materials; or the covering structure 140 may be a single-layer or multi-layer structure made of alloy materials.

It is worth noting that since the modification step is performed along the surfaces of the metal nanowires 122, the shape of the covering structure 140 substantially grows according to the shape of each metal nanowire 122. In the modification step, the growth conditions of the covering structure 140 (e.g., the electroless plating time and/or the component concentration of the electroless plating solution) can be controlled, such that the covering structure 140 only covers the surfaces of the metal nanowires 122 without over-growing. Moreover, as mentioned above, the pre-cured or incompletely cured film layer 130 can also play a role in limiting or controlling growth. In this way, the covering structure 140 formed by the modification step does not precipitate/grow alone on the film layer 130 without contacting the metal nanowires 122, but is formed between the surface of each metal nanowire 122 and the film layer 130. In some embodiments, the film layer 130 is still filled between the adjacent metal nanowires 122. On the other hand, the covering structure 140 formed by electroless plating/electrolytic plating has a high density. Compared to the size of the peripheral trace 150 and the thin line L of the touch sensing electrode 170 (e.g., the line width is about 10 μm), the defect size of the covering structure 140 is about 0.01 to about 0.001 times the size of the peripheral trace 150 and the thin line L of the touch sensing electrode 170. Therefore, even if the covering structure 140 has a defect, it does not cause the peripheral trace 150 and the touch sensing electrode to be disconnected. In some embodiments, a curing step may further be performed after the modification step, such that the pre-cured or incompletely cured film layer 130 reaches a fully cured state.

After the aforementioned steps, the touch panel 100 as shown in FIG. 2A can be formed. In general, the peripheral trace 150 located on the peripheral area PA may at least include the metal nanowire layer 120 formed of the modified metal nanowires 122, and the touch sensing electrodes 170 located on the non-bending area NR may also at least include the metal nanowire layer 120 formed of the modified metal nanowires 122. That is, the metal nanowires 122 of the peripheral trace 150 and the touch sensing electrode 170 on the non-bending area NR are all covered with the covering structure 140, in which the covering structure 140 may have the same or similar structural appearance as the metal nanowires 122, and the film layer 130 is filled between the adjacent metal nanowires 122.

References are made back to FIG. 2A and FIG. 2B. In some embodiments, there may be non-conductive areas 180 between the adjacent peripheral traces 150 on the peripheral area PA and between the adjacent touch sensing electrodes 170 on the visible area VA to electrically isolate the adjacent peripheral traces 150 and the adjacent touch sensing electrodes 170. In some embodiments, the non-conductive area 180 may substantially be a gap. In some embodiments, the aforementioned etching method may be utilized to form the gaps located between the peripheral traces 150 and between the touch sensing electrodes 170.

Figure 4:
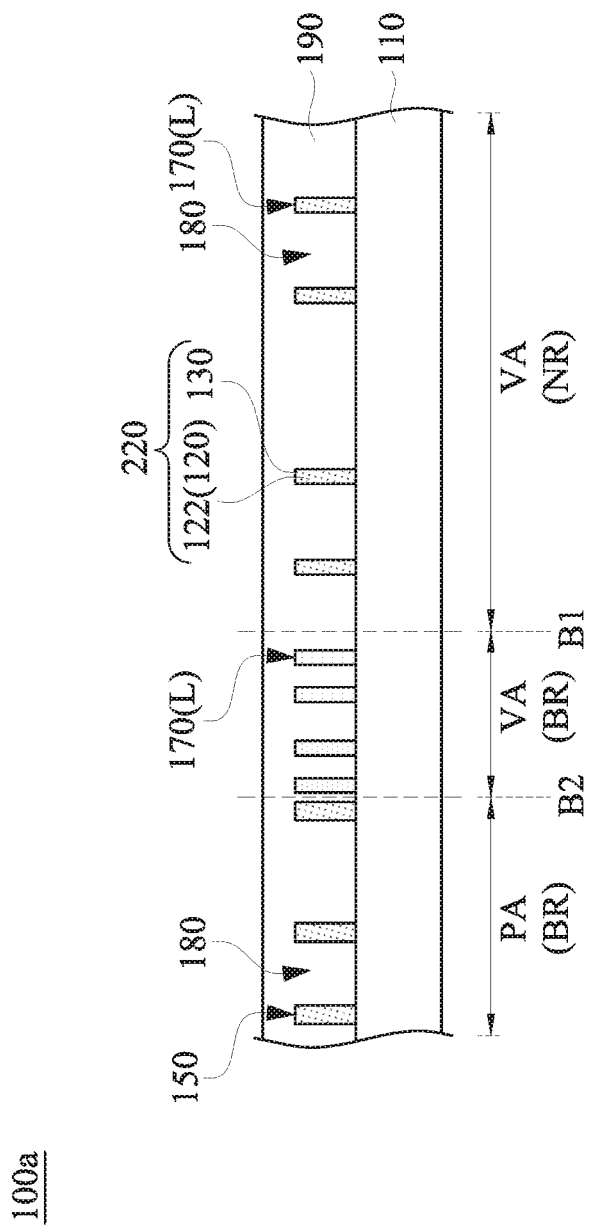
FIG. 4 is a schematic cross-sectional view illustrating a touch panel according to some other embodiments of the present disclosure.

In some embodiments, the touch panel may further include a protective layer. Specifically, reference is made to FIG. 4, which is a schematic cross-sectional view illustrating a touch panel 100a according to other embodiments of the present disclosure, in which the position of the cross section thereof is the same as that in FIG. 2B. The touch panel 100a includes a protective layer 190, and the material of the protective layer 190 can be the same as the material of the film layer 130 described above. In some embodiments, the protective layer 190 covers the touch panel 100 entirely. That is, the protective layer 190 covers the peripheral trace 150 and the touch sensing electrode 170. The protective layer 190 can further be filled in the non-conductive areas 180 between the adjacent peripheral traces 150 to electrically isolate the adjacent peripheral traces 150, or the protective layer 190 can be filled in the non-conductive areas 180 between the adjacent touch sensing electrodes 170 to electrically isolate the adjacent touch sensing electrodes 170.

Figure 5A:
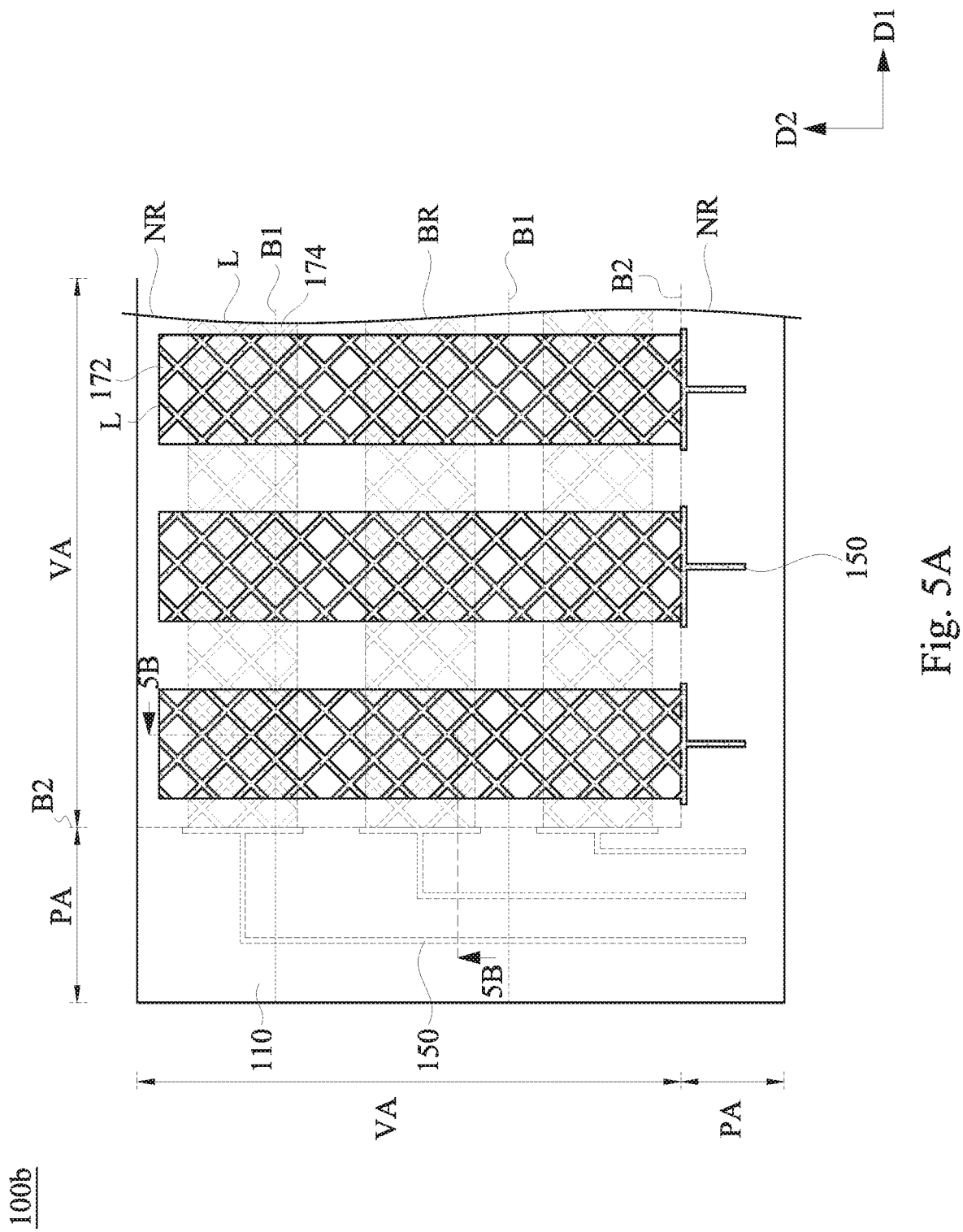
FIG. 5A is a schematic top view illustrating a touch panel according to some other embodiments of the present disclosure.
Figure 5B:
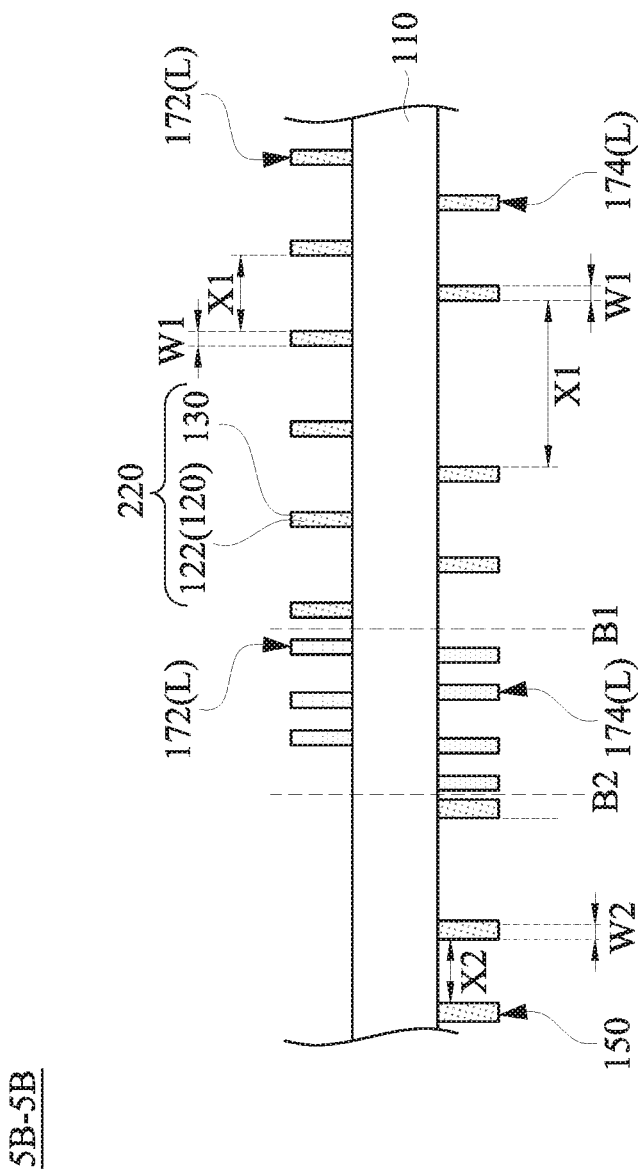
FIG. 5B is a schematic cross-sectional view illustrating the touch panel in FIG. 5A taken along the line 5B-5B according to some embodiments of the present disclosure.

FIG. 5A is a schematic top view illustrating a touch panel 100b according to other embodiments of the present disclosure. FIG. 5B is a schematic cross-sectional view illustrating the touch panel 100b in FIG. 5A taken along the line 5B-5B according to some embodiments of the present disclosure. References are made to FIG. 5A and FIG. 5B. The touch panel 100b is a double-sided single-layer touch panel 100b. For clarity and convenience of description, in the embodiments of FIG. 5A and FIG. 5B, the first touch sensing electrode 172 and the second touch sensing electrode 174 are used to illustrate the configuration of the touch sensing electrodes. The first touch sensing electrode 172 is disposed on a first surface (e.g., the upper surface) of the substrate 110, and the second touch sensing electrode 174 is disposed on a second surface (e.g., the lower surface) of the substrate 110, such that the first touch sensing electrode 172 and the second touch sensing electrode 174 are electrically isolated from each other. In some embodiments, the first touch sensing electrode 172 includes multiple strip-shaped electrodes extending along a second direction D2, and the multiple strip-shaped electrodes may be arranged equidistantly along a first direction D1. The second touch sensing electrode 174 includes multiple strip-shaped electrodes extending along the first direction D1, and the multiple strip-shaped electrodes may be arranged equidistantly along the second direction D2. The first direction D1 and the second direction D2 are perpendicular. In other words, the extending directions of the first touch sensing electrode 172 and the second touch sensing electrode 174 are different and interlaced with each other. The first touch sensing electrode 172 and the second touch sensing electrode 174 can transmit control signals and receive touch sensing signals, respectively. In this way, the touch position can be obtained by detecting the signal variation (e.g., the variation of capacitance) between the first touch sensing electrode 172 and the second touch sensing electrode 174.

In some embodiments, each of the first touch sensing electrode 172 and the second touch sensing electrode 174 has the mesh pattern interlaced by multiple thin lines L and includes the metal nanowire layer 120 formed by the modified metal nanowires 122. As mentioned above, the modified metal nanowires 122 and the film layer 130 added onto the modified metal nanowires 122 are patterned to form the mesh pattern interlaced by multiple thin lines L, and the formed mesh pattern is the electrode pattern of the first touch sensing electrode 172 and the second touch sensing electrode 174. In some embodiments, the thin lines L of the first touch sensing electrode 172 and the thin lines L of the second touch sensing electrode 174 are not completely overlapped with each other. Specifically, when viewed from the top (i.e., the viewing angle in FIG. 5A), the intersection of the two thin lines L of the second touch sensing electrode 174 can be located at the very center of the mesh formed by the thin lines L of the first touch sensing electrode 172; similarly, the intersection of the two thin lines L of the first touch sensing electrode 172 can also be located at the very center of the mesh formed by the thin lines L of the second touch sensing electrode 174. However, the present disclosure is not limited in this regard. In other embodiments, the thin lines L of the first touch sensing electrode 172 may completely overlap the thin lines L of the second touch sensing electrode 174. The first touch sensing electrode 172 is electrically connected to the corresponding peripheral trace 150, and the second touch sensing electrode 174 is also electrically connected to the corresponding peripheral trace 150.

As in the aforementioned embodiments, the peripheral trace 150, the first touch sensing electrode 172 on the non-bending area NR, and the second touch sensing electrode 174 on the non-bending area NR all include the modified metal nanowires 122 and the film layer 130, and the first touch sensing electrode 172 on the bending area BR and the second touch sensing electrode 174 on the bending area BR all include the unmodified metal nanowires 122 and the film layer 130. In other words, the covering structure 140 can be formed on the surfaces of the metal nanowires 122 of the peripheral trace 150, the first touch sensing electrode 172 on the non-bending area NR, and the second touch sensing electrode 174 on the non-bending area NR according to the aforementioned method. On the other hand, the line width W1 and line spacing X1 of the thin lines L of the first touch sensing electrode 172 and the second touch sensing electrode 174 and the line width W2 and line spacing X2 of the peripheral trace 150 can refer to the aforementioned descriptions, which will not be repeated hereinafter.

The manufacturing method of the double-sided single-layer touch panel 100b shown in FIG. 5A and FIG. 5B includes step S30 to step S36. In step S30, a substrate 110 having the predefined peripheral area PA and visible area VA as well as the predefined bending area BR and the predefined non-bending area NR is provided, and the unmodified metal nanowires 122 are disposed on two opposite surfaces of the substrate 110 to form the metal nanowire layers 120 on the peripheral areas PA and the visible areas VA (including the areas in the bending area BR and the non-bending area NR) of the two opposite surfaces of the substrate 110. In step S32, the film layers 130 are disposed on the unmodified metal nanowires 122, such that the film layers 130 cover the unmodified metal nanowires 122 on the two opposite surfaces of the substrate 110, in which the film layers 130 are in the pre-cured or incompletely cured state. In step S34, a double-sided patterning step is performed to form the patterned metal nanowire layers 120, in which the metal nanowire layers 120 located on the peripheral areas PA of the two opposite surfaces of the substrate 110 are patterned to form the peripheral traces 150, and the metal nanowire layers 120 on the visible areas VA (including the areas in the bending areas BR and the non-bending areas NR) of the two opposite surfaces of the substrate 110 are patterned to form the touch sensing electrodes 170. In step S36, a double-sided modification step is performed to form the covering structures 140 on the metal nanowires 122 of the two opposite surfaces of the substrate 110, such that the peripheral traces 150 located on the peripheral areas PA of the two opposite surfaces of the substrate 110 and the touch sensing electrodes 170 located on the non-bending areas NR of the two opposite surfaces of the substrate 110 include the modified metal nanowires 122, and the touch sensing electrodes 170 located on the bending areas BR include the unmodified metal nanowires 122. The manufacturing method of the double-sided single-layer touch panel 100b is similar to the manufacturing method of the single-sided touch panel 100 described above and will not be repeated hereinafter.

The modification method of the metal nanowire in the present disclosure can also be applied to manufacturing sensing electrodes that have no requirement for light transmittance, such as but not limited to touch panels of notebooks, antenna structures, and coils for wireless charging. In some embodiments, the sensing electrodes can be connected to the wirings, so as to be connected to an external circuit for transmitting signals. In some embodiments, the wirings may be equivalent to the peripheral traces as described above, which also include the modified metal nanowires.

The touch panel of the present disclosure can be assembled with other electronic devices, such as a display with touch function. For example, the substrate can be bonded to a display device (e.g., a liquid crystal display device or an organic light-emitting diode display device), and optical adhesive or other adhesives can be used to bond therebetween. The touch sensing electrodes may also be bonded with an outer cover layer (e.g., a protective glass) through the optical adhesive. The touch panel and antenna in the present disclosure can be applied to electronic devices such as portable phones, tablets, and notebooks, and can also be applied to flexible products. The touch panel of the present disclosure can also be applied to a polarizer. The electrodes of the present disclosure can be applied to wearable devices (e.g., watches, glasses, smart clothes, and smart shoes) and automotive devices (e.g., dashboards, driving recorders, rearview mirrors, and windows).

According to the aforementioned embodiments of the present disclosure, since the peripheral trace located on the peripheral area and a portion of the touch sensing electrode located on the visible area in the touch panel of the present disclosure are formed of the modified metal nanowires, the surface resistance of the touch panel can be effectively reduced to enhance the conductivity of the touch panel, and the resistive capacitive loading value of the touch panel can be reduced. Furthermore, since the covering structure does not exist on the bending area, the bendability of the touch panel can be well maintained. On the other hand, since the touch sensing electrode on the visible area has the mesh pattern interlaced by multiple thin lines, the touch sensing electrode can prevent the light transmittance of the visible area from being affected by the modified metal nanowires. As a result, the visible area of the touch panel has good optical characteristics. Moreover, since the peripheral trace and touch sensing electrode can be manufactured in the same manufacturing process through the steps of deposition and patterning, the steps of overlapping and the space occupied by the overlapping can be omitted, thereby reducing the width of the peripheral area of the touch panel, so as to meet the requirement for the display with narrow bezel.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch panel, comprising:
   a substrate having a visible area and a peripheral area and having a bending area and a non-bending area;
   a peripheral trace disposed on the peripheral area of the substrate; and
   a first touch sensing electrode disposed on the visible area of the substrate and having a first portion on the bending area and a second portion on the non-bending area, wherein the first touch sensing electrode is electrically connected to the peripheral trace and has a mesh pattern interlaced by a plurality of first thin lines,
   wherein each of the peripheral trace and the first touch sensing electrode comprises a plurality of conductive nanostructures and a film layer added onto each of the conductive nanostructures, an interface between each of the conductive nanostructures and the film layer that are in the peripheral trace and in the second portion of the first touch sensing electrode substantially has a covering structure, the covering structure comprises a plating layer, and the plating layer completely covers the interface between each of the conductive nanostructures and the film layer.

2. The touch panel of claim 1, wherein the film layer is filled between adjacent conductive nanostructures of the conductive nanostructures, and the film layer does not have the covering structure that exists alone.

3. The touch panel of claim 1, wherein each of the conductive nanostructures comprises a metal nanowire, and a covering layer is uniformly formed on an interface between the metal nanowire and the film layer.

4. The touch panel of claim 1, wherein the plating layer is a single-layer structure made of a single metal material or an alloy material, or a bilayer or multi-layer structure made of two or more metal materials or alloy materials.

5. The touch panel of claim 1, wherein the plating layer is an electroless copper plating layer, an electroplating copper layer, an electroless copper-nickel plating layer, an electroless copper-silver plating layer, or combinations thereof.

6. The touch panel of claim 1, wherein each of the conductive nanostructures and the film layer are located in each of the first thin lines.

7. The touch panel of claim 1, wherein each of the conductive nanostructures, the film layer, and the covering structure are located in each of the first thin lines of the second portion of the first touch sensing electrode.

8. The touch panel of claim 1, wherein a boundary is between the bending area and the non-bending area, and a line width of each of the first thin lines crossing the boundary gradually increases from being far from the boundary to being close to the boundary.

9. The touch panel of claim 8, wherein each of the first thin lines crossing the boundary has a first portion far from the boundary and a second portion close to the boundary, a line width of the first portion is between 1 μm and 5 μm, and a line width of the second portion is between 5 μm and 30 μm.

10. The touch panel of claim 1, wherein a boundary is between the visible area in the bending area and the peripheral area, and a line width of each of the first thin lines adjacent the boundary gradually increases from being far from the boundary to being close to the boundary.

11. The touch panel of claim 10, wherein each of the first thin lines adjacent the boundary has a first portion far from the boundary and a second portion close to the boundary, a line width of the first portion is between 1 μm and 5 μm, and a line width of the second portion is between 5 μm and 30 μm.

12. The touch panel of claim 1, wherein the substrate has a first surface and a second surface facing away from each other, the first touch sensing electrode is disposed on the first surface of the substrate, and the touch panel further comprises:
   a second touch sensing electrode disposed on the second surface of the substrate and on the visible area, wherein the second touch sensing electrode has a mesh pattern interlaced by a plurality of second thin lines.

13. The touch panel of claim 12, wherein the second touch sensing electrode has a first portion on the bending area and a second portion on the non-bending area, the second touch sensing electrode comprises the conductive nano structures and the film layer added onto each of the conductive nanostructures, and an interface between each of the conductive nanostructures and the film layer that are in the second portion of the second touch sensing electrode substantially has the covering structure.

14. The touch panel of claim 12, wherein the mesh pattern interlaced by the first thin lines is not completely overlapped with the mesh pattern interlaced by the second thin lines.

15. A device comprising the touch panel of claim 1.

16. The device of claim 15, wherein the device comprises a display, a portable phone, a tablet, a wearable device, a car device, a notebook, or a polarizer.

17. A touch panel, comprising:
   a substrate having a visible area and a peripheral area and having a bending area and a non-bending area;
   a peripheral trace disposed on the peripheral area of the substrate; and
   a first touch sensing electrode disposed on the visible area of the substrate and having a first portion on the bending area and a second portion on the non-bending area, wherein the first touch sensing electrode is electrically connected to the peripheral trace and has a mesh pattern interlaced by a plurality of first thin lines,
   wherein each of the peripheral trace and the first touch sensing electrode comprises a plurality of conductive nanostructures and a film layer added onto each of the conductive nanostructures, an interface between each of the conductive nanostructures and the film layer that are in the peripheral trace and in the second portion of the first touch sensing electrode substantially has a covering structure, each of the conductive nanostructures comprises a metal nanowire, the covering structure completely covers an interface between the metal nanowire and the film layer, and a covering layer is uniformly formed on the interface between the metal nanowire and the film layer.

18. The touch panel of claim 17, wherein a boundary is between the bending area and the non-bending area, and a line width of each of the first thin lines crossing the boundary gradually increases from being far from the boundary to being close to the boundary.

19. A touch panel, comprising:
   a substrate having a visible area and a peripheral area and having a bending area and a non-bending area;
   a peripheral trace disposed on the peripheral area of the substrate; and
   a first touch sensing electrode disposed on the visible area of the substrate and having a first portion on the bending area and a second portion on the non-bending area, wherein the first touch sensing electrode is electrically connected to the peripheral trace and has a mesh pattern interlaced by a plurality of first thin lines,
   wherein each of the peripheral trace and the first touch sensing electrode comprises a plurality of conductive nanostructures and a film layer added onto each of the conductive nanostructures, an interface between each of the conductive nanostructures and the film layer that are in the peripheral trace and in the second portion of the first touch sensing electrode substantially has a covering structure, and the covering structure is a single-layer structure made of a single metal material or an alloy material or the covering structure is a bilayer or multi-layer structure made of two or more metal materials or alloy materials.

20. The touch panel of claim 19, wherein a boundary is between the visible area in the bending area and the peripheral area, and a line width of each of the first thin lines adjacent the boundary gradually increases from being far from the boundary to being close to the boundary.

* * * * *